UNITED STATES PATENT OFFICE.

FREDERICK H. SNYDER, OF JERSEY CITY, NEW JERSEY, ASSIGNOR OF ONE-THIRD TO GEORGE W. RICHARDSON AND MARTIN LUSCOMB, BOTH OF BOSTON, MASSACHUSETTS.

REFRACTORY AND NON-CONDUCTING MATERIAL FROM GAS-CARBON FOR CRUCIBLES, FURNACE-LININGS, GLASS-POTS, BESSEMER CONVERTERS, ARTIFICIAL-STONE POLISHING-WHEELS, &c.

SPECIFICATION forming part of Letters Patent No. 357,105, dated February 1, 1887.

Application filed October 22, 1883. Renewed May 15, 1885. Serial No. 165,678. (No specimens.)

*To all whom it may concern:*

Be it known that I, FREDERICK H. SNYDER, a citizen of the United States, residing at Jersey City, in the county of Hudson and State of New Jersey, have invented certain new and useful Improvements in Refractory and Non-Conducting Material from Gas-Carbon for Crucibles, Furnace-Linings, Glass-Pots, Bessemer Converters, Artificial-Stone Polishing-Wheels, &c., of which the following is a specification.

My invention relates to the use of gas-carbon for refractory and non-conducting purposes, or any similar purpose where it is desirable to use a material possessing great heat-resisting properties, such as furnace-linings, glass pots and molds, Bessemer crucibles, tuyeres, ingot-molds for steel and other metals, and for artificial stone, millstones, emery-wheels, wheels for polishing metal, and the like.

I have found by experiments made with the material known as "gas-carbon" and products therefrom that when properly prepared this substance can be utilized for many purposes where it becomes an object to resist the action of heat, and there are a variety of ways in which it may be prepared and used. For using it to take the place of fire-brick or for lining crucibles for the reduction of metals or production of steel by what is known as the "Bessemer" or similar processes, I prefer to finely pulverize the carbon and afterward mold it into desired forms under pressure by any of the well-known processes, and burn it or bake it in an oven or kiln. It may, however, after being finely ground, be mixed with a cementing compound and used in a plastic state and applied like mortar, as the action of applied heat, when properly compounded, will cause it to harden and admit of a smooth or polished surface to the part exposed. This is desirable where it is used for coating the outer surface of generators or conductors of heat—such as steam-boilers, pipes, cylinders, hot-air furnaces, &c.

In my application for Letters Patent allowed the 15th of June, 1883, Serial No. 95,045, I have described a process of heating the material found in gas-retorts, and separating the same into different grades of purity and fineness. While I do not limit myself to the use of gas-carbon treated in the manner described in my application referred to for the purposes described in this application, yet where it is desirable to procure a carbon possessing the greatest non-conducting or heat-resisting properties, or where it is desirable to finish the same after preparation with a smooth or polished surface, I prefer to use gas-carbon treated and prepared in the manner described.

In carrying out my invention I take gas-carbon as it comes from retorts and pulverize the same by any suitable method. If it is desired to produce a composition for the interior of heated surfaces, or for the manufacture of retorts, crucibles, or similar purposes, I prefer to use for a cementing material asphalt, rosin, or any material of similar nature containing volatile hydrocarbon. From two to three per cent. of the material may be mixed with the carbon, using sufficient heat to melt and thoroughly intermingle the cementing material with the carbon. It may then be molded into the desired forms, after which it should be baked in a suitable oven or kiln until all volatile hydrocarbon used in the compounding is driven off and the material has become hard and suitable for the uses described. When the compound is to be used for coating the exterior of heated surfaces, a different character of cementing material may be used, the nature of which should depend upon the degree of heat that the compound is to be subjected to after application. For coating outer surfaces subjected to great interior heat—such as furnaces, hot-blast pipes, &c.—a cementing material of a nature similar to that I have named may be used; but for coating boilers, steam-pipes, &c., where less heat is attained and it is desired to make a covering possessing greater tenacity, hard rubber or similar material may be used. In this instance five or ten per cent. of the material may be used, according to the nature of the material and the strength of the compound required.

For non-conducting purposes there are many substances that may be advantageously used and mixed with the carbon. Among them are asbestus, mineral wool, talc, pumice-stone, clay, &c. These and analogous substances may be mixed in small quantities with the carbon without materially impairing its utility. For making artificial stone, for grinding or polishing, finely pulverized emery may be mixed with the carbon. For such purposes the proportions of emery to the carbon may be graded so as to produce a stone of any desired quality. If it is to be used for cutting or grinding, a larger proportion of emery may be used than if desired simply for polishing fine metals. For cementing this mixture any of the hydrocarbons may be used, and when thoroughly mixed should be pressed into desired forms and baked, as before described.

Having thus described my invention, what I claim as new, and desire to secure by Letters Patent, is—

1. In the manufacture of crucibles and other articles requiring a refractory compound, the use of gas-carbon as an element either with or without cementing material, substantially as described.

2. As a new manufacture, crucibles and other vessels and articles, such as herein described, composed of gas-carbon as an essential ingredient, substantially as set forth.

3. The combination of gas-carbon with a suitable cement, so as to form a plastic mass capable of being molded into useful articles, as described.

In testimony whereof I affix my signature in presence of two witnesses.

FREDERICK H. SNYDER.

Witnesses:
GEORGE W. JOHNES,
D. W. BLISS.